W. ELLIOTT.
FRONT TRUCK FOR CULTIVATORS AND OTHER AGRICULTURAL IMPLEMENTS.
APPLICATION FILED AUG. 10, 1917.
1,279,677.
Patented Sept. 24, 1918.
2 SHEETS—SHEET 2.
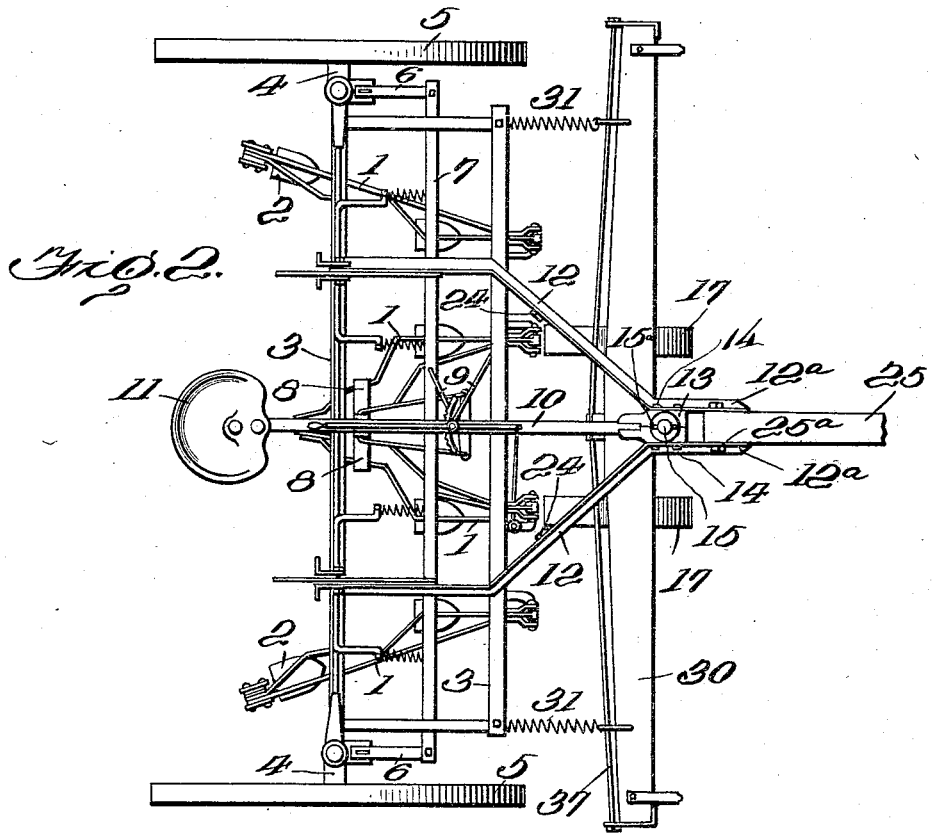
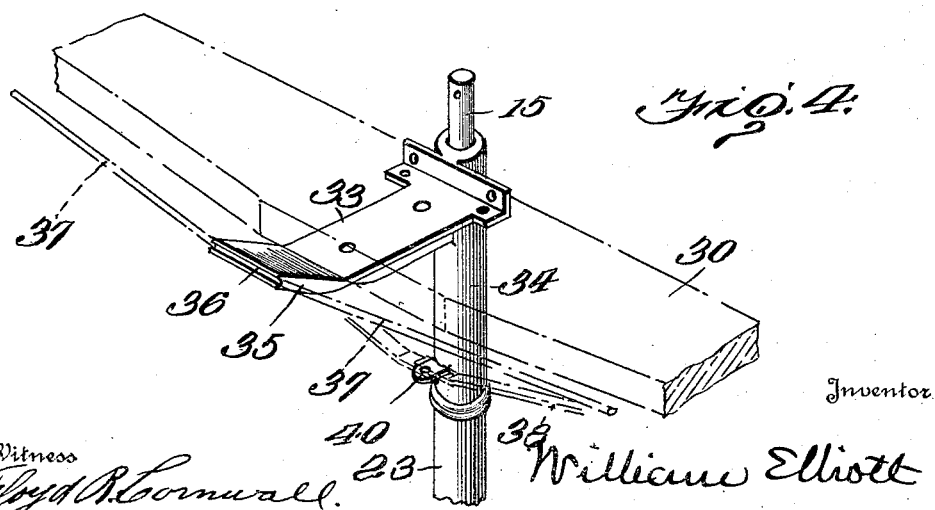

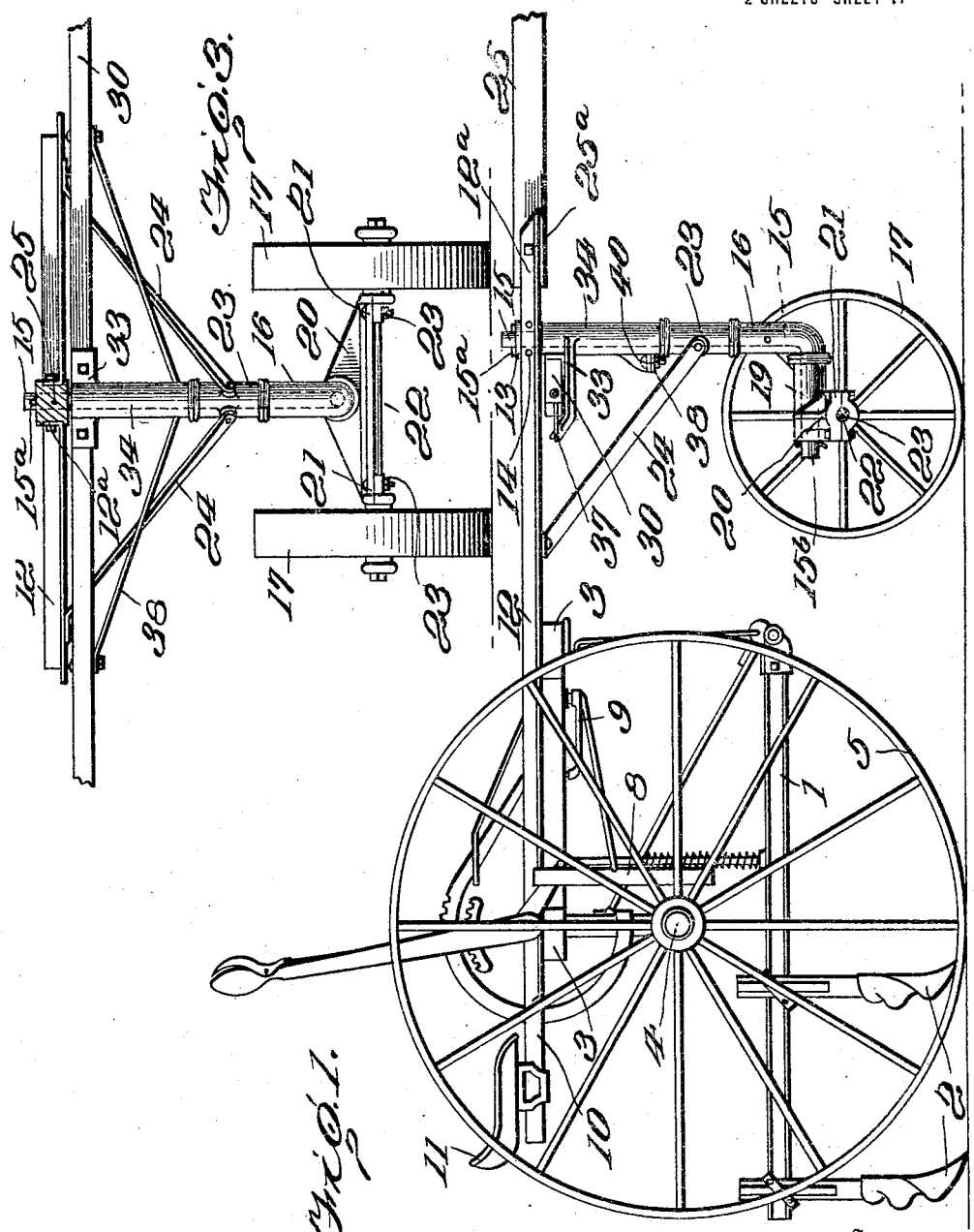

UNITED STATES PATENT OFFICE.

WILLIAM ELLIOTT, OF BEATRICE, NEBRASKA, ASSIGNOR TO DEMPSTER MILL MANUFACTURING COMPANY, OF BEATRICE, NEBRASKA, A CORPORATION OF NEBRASKA.

FRONT TRUCK FOR CULTIVATORS AND OTHER AGRICULTURAL IMPLEMENTS.

1,279,677.   Specification of Letters Patent.   Patented Sept. 24, 1918.

Application filed August 10, 1917. Serial No. 185,508.

*To all whom it may concern:*

Be it known that I, WILLIAM ELLIOTT, a citizen of the United States, and resident of Beatrice, county of Gage, and State of Nebraska, have invented certain new and useful Improvements in and Relating to Front Trucks for Cultivators and other Agricultural Implements, of which the following is a specification.

This invention relates to certain improvements in front trucks for cultivators and other agricultural implements; and the objects and nature of the invention will be readily understood by those skilled in the art in the light of the following explanation of the accompanying drawings illustrating what I believe to be the preferred mechanical expression or embodiment of my invention from among other forms, constructions and arrangements within the spirit and scope thereof.

One object of the invention is to provide certain improvements in front trucks for cultivators and other implements, whereby a wheeled support of the caster type can be advantageously employed to avoid the tendency of the truck to unduly tilt when the implement makes short turns, which tendency is increased in those instances where the tongue is coupled to the truck and the truck is directly guided thereby.

A further object of the invention is to provide a cultivator or other implement with a front part of the frame supported by and upheld by a front caster truck, with the vertically swingable tongue so coupled directly to said part of the frame as to guide the implement independently of the truck which freely casters in following the frame and tongue.

A further object of the invention is to provide an improved front truck which is applicable to wheeled straddle row cultivators, disk harrows, grain drills and other tillage implements.

A further object of the invention is to provide a front truck for tillage implements wherein the evener bar is mounted and braced in an improved manner without regard to whether or not the truck is strictly of the caster wheel type.

A further object of the invention is to provide certain improvements in combinations and construction of elements, whereby a highly advantageous front truck for tillage implements will be produced.

The invention consists in certain novel features in construction and in combinations and arrangements as more fully and particularly set forth and specified hereinafter.

Referring to the accompanying drawings:—

Figure 1, is a side elevation of a straddle row cultivator embodying my invention.

Fig. 2, is a plan thereof.

Fig. 3, is a front elevation, portions of the cultivator not being shown.

Fig. 4, is a detail perspective somewhat diagrammatically illustrating certain features.

In the specific example illustrated, although I do not wish to so limit my invention, I show any suitable cultivator frame provided with swingable lever controlled drag bars 1, carrying shovel or other soil digging or stirring tools 2, with the drag bars and shovels arranged in gangs to cultivate two rows of corn or other plants straddled by the frame.

The frame embodies a pair of transverse parallel beams 3, the rear one of which constitutes in effect, an arched axle at the ends of which horizontally swingable stub axles or spindles 4 are pivoted, on which the supporting and steering wheels 5 are mounted. These stub axles are provided with forwardly extending arms 6 rigid therewith, and at their front ends joined to the ends of a connecting rod or bar 7 by which said arms are simultaneously swung horizontally to direct the wheels to the right or left and by which the wheels are held in the desired adjustment. In cultivators of this type, means are provided by which the operator can move said connecting bar to direct said wheels in the desired direction, and I show foot levers or pedals 8 for this purpose, suitable operative connections 9, being provided between said foot levers and the connecting bar, to cause said bar to direct the wheels to the right, say, when the right hand foot is depressed or swung forward, and to cause said bar to direct the wheels to the left, say, when the left hand foot lever is depressed or operatively swung.

Those skilled in the art are familiar with the various constructions which can be utilized under the control of the operator for directing the steering wheels to the right, left or straight ahead, as may be required to follow the rows of plants being cultivated.

The cultivator frame is provided with a horizontally-disposed rigid central forwardly tapered extension composed of the central fore and aft or longitudinal seat bar 10 at its rear end carrying seat 11, and from thence extending forwardly across the centers of the frame beams 3 to which it is fixed, to a point in advance of the front beam; the two side bars 12 traversing and rigidly secured to the end portions of the beams 3, and in advance thereof converging forwardly toward the projected front end of the seat bar; and a front head 13 usually consisting of one or more castings receiving the projected front ends of the bars 10 and 12. This head is horizontally disposed and centrally and longitudinally receives the front end of bar 10, while the front ends of the bars 12 are bent in parallelism and fit the opposite edges of the head and the various bar ends and the head sections are rigidly secured together by suitable cross bolts 14.

The parallel front ends 12$^a$ of the frame bars 12, are extended forwardly beyond the head 13 to receive the rear end of the tongue 25. The rear end of the tongue fits between said frame bar ends and is pivotally joined thereto by horizontal pivot bolt 25$^a$ extending transversely through the tongue and the frame bar ends. The tongue is freely swingable vertically on said bolt and the frame bar ends hold the tongue against operative lateral movement independently of said frame bars. The tongue hence serves to guide the front end of the implement frame.

The head 13 is formed with a bearing opening or hole extending vertically therethrough intermediate the ends and sides thereof, to receive the upper end of the upright spindle or shaft 15 of the caster wheel front truck. This spindle is freely rotatable in said head and its upper end projects above the head and is provided with any suitable stop, such as cotter pin 15$^a$ above the head. The spindle is straight and vertical throughout the major portion of its length, but its lower portion is bent at right angles to form the rearwardly extending horizontal arm or journal end 15$^b$ on which a bearing sleeve 19, is longitudinally arranged and confined to rotate. This horizontally disposed sleeve is arranged above and is preferably formed integral with a transversely arranged bolster like member, bracket or cross axle 20 depending from the rear end of the sleeve and at the under sides of its outer ends formed with the upper halves or sections 21 of clamps or boxes. A shaft 22 is arranged longitudinally along the bottom edge of said cross member 20, and is rigidly secured thereto by the lower sections or halves 23 of the clamps or boxes, said sections being bolted together. The ends of the fixed shaft or axle 22 project laterally beyond the clamps and cross member 20, and the truck or caster wheels 17 are confined thereto to freely rotate thereon.

The two similar truck wheels 17 are relatively small in diameter and are spaced a short distance apart, for instance to enable them to travel between the two rows of plants being cultivated.

On the lower portion of the spindle 15 a head or sleeve 16 is fixed, and the top edge of this head 16 forms an abutment or bearing edge on which the lower edge of a fixed vertical bearing sleeve 23 rests. The spindle passes freely through and is rotatable in said bearing sleeve 23. This sleeve 23 provides the lower bearing or box for the spindle 15 and aids in upholding the front end of the cultivator frame and in fact is fixed to and forms a part of said frame through the medium of downwardly converging braces 24 at their lower forward ends bolted or otherwise fixed to said sleeve and at their rear ends bolted or otherwise fixed to frame bars 12 at points thereon between the frame beams and the front head 13.

A long evener 30 is provided having a vertical bearing or socket loosely receiving the spindle of the front truck, and this socket is arranged at the center of the length of the front edge of the evener so that the pull of the draft animals on the evener is sustained by said truck spindle and thus transmitted to the cultivator or other implement frame, where not transmitted by the loosely hanging normally slack chains or other connections 31, from the end portions of the evener to the front end portions of the main frame of the implement.

Those skilled in the art are acquainted with various means that can be employed for hitching the draft animals to the evener 30 and for properly arranging said animals with respect to the tongue 25, and connecting the same thereto.

In the example illustrated, the evener is arranged immediately under the front head 13 of the center forward projection of the cultivator frame and over the truck wheels and immediately behind the truck spindle, and is bolted or otherwise fixed to and supported by a strong casting, saddle or transverse bracket 33, at the center of its front edge formed with a vertically elongated bearing socket or sleeve 34 through which the spindle 15 loosely passes. This sleeve 34 is freely rotatable on the vertical length of the spindle 15 between the frame head 13 and the lower bearing sleeve or box 23. The frame head 13 approximately engages the upper end of sleeve 34 while said sleeve is upheld by bearing box 23 on which its lower edge rests. The bracket forms a transverse shelf 33 projecting rearwardly from the vertically elongated sleeve 34 and the evener is fitted down on this shelf and forwardly against the longitudinal vertical flange or edge wall of the bracket, and is fixedly secured thereto by bolts or other suitable means. The shelf is formed with a central projection 35 extending rearwardly beyond the evener, and at a point opposite the center of the length of the rear edge of the evener and spaced a distance rearwardly therefrom, said arm is provided with a center pivot or bearing 36 for the rear truss rod 37 at its ends secured to the ends of the evener and bracing the same against yielding forwardly under the pull of the draft animals.

I preferably provide this long evener 30 with a truss rod 38 to brace the ends thereof against springing upwardly. The ends of this rod are secured to portions of the evener at opposite sides of its center, and the rod depends from and is arranged at the under side of the evener, and any suitable device is provided to form the fixed depressed center bearing or abutment for this truss rod. For instance, I show the vertically elongated sleeve 34 at its lower rear portion formed with a rearward projection 40 overhanging and fitting down on the top surface of the depressed center of said truss rod 38 and forming the center bearing therefor, to resist upward strain thereof.

The draft of the drag bars when the shovels are working, tends to depress the front of the cultivator frame, but in the implement of my present invention, the front truck receives this pressure through the medium of the forward center projection of the cultivator frame, and upholds the front of the frame at a certain level during the operation of the cultivator and relieves the draft animals of all neck weight excepting the unobjectionable weight of the vertically movable tongue. By locating the evener under the front end or head of said forward projection and approximately against the spindle of the front truck, advantages are attained and furthermore side lash of the tongue does not result when the cultivator wheels strike obstructions or when said wheels are tilted by the steering mechanism, inasmuch as the evener is loosely mounted at its center on the spindle, and the central forward projection of the frame is also loosely mounted on said spindle.

I also attain advantages by coupling the vertically swingable tongue to the forward frame extension inasmuch as the truck axle is thus left free to rock vertically independently of the spindle in following the inequalities of the ground without tilting and rocking the tongue and without being disturbed in its free movement as it would be should the tongue be coupled directly to said axle.

Advantages are also attained by providing the trailing front truck capable of freely and quickly swinging or castering as the frame changes its direction of forward movement and thereby automatically follows the direction of forward movement of the frame and tongue. The tongue either guides the frame or swings with it, thereby avoiding the tendency of the front truck to slide sidewise and tip over when the implement is making a short turn, which often occurs when the tongue is coupled to and guides the front truck. It is also advantageous to attach the tongue to the frame to guide the implement, providing a trailing front truck free to caster independently of the tongue.

I also attain advantages by providing the front truck spindle with a rearwardly extending end on which the sleeve carrying the transverse axle of the two truck wheels is free to oscillate or rotate, as said wheels rise and fall in following inequalities of the ground. I also gain advantages by forming this sleeve with the transverse bolster-like member depending therefrom.

The front of the cultivator frame is upheld by the head 13, and the sleeve 23, both rigid with the frame extension and spaced a distance apart and arranged centrally with respect to the width of the cultivator, and resting on parts carried by said spindle, and the cultivator frame also receives its draft through said spindle and said head and sleeve, from the evener which is in effect arranged on the spindle between said head and said sleeve, whereby an exceedingly compact, durable and efficient arrangement is provided.

It is evident that various changes, modifications and variations might be resorted to without departing from the spirit and scope of my invention and hence I do not wish to limit my invention to the exact disclosure hereof.

What I claim is:—

1. In combination, a frame, a wheeled front truck upholding the front of the frame and pivotally coupled thereto to turn independently thereof on a vertical axis, a bracket mounted and freely turnable horizontally on said axis, an evener supported by said bracket and at its central portion fitted and rigidly secured to said bracket, and a rear truss rod for said evener, said bracket having a rearwardly projecting portion providing a center abutment for said truss rod.

2. In combination, a frame, a wheeled front truck provided with a vertical spindle mounted in and upholding the front of the frame, a bracket mounted and freely turnable horizontally on said spindle, an evener secured to and carried by said bracket, said evener provided with a depending truss rod to brace the ends of the evener against springing upwardly, and means on the spindle providing an abutment for the central lower portion of said truss rod.

3. In combination, a frame, a wheeled front truck upholding the front of the frame and pivotally coupled thereto to turn independently thereof on a vertical axis, a sleeve mounted and freely turnable on said axis and provided with a rearwardly extending bracket, and an evener supported by said sleeve and at its central portion fitted and rigidly secured to said bracket.

4. In combination, an implement frame having a rigid forward extension provided with a vertical bearing opening, a vertically swingable tongue coupled to said extension for steering the frame laterally, and a freely laterally swingable trailing caster wheel truck upholding said front extension and comprising an upright spindle freely turnable in said bearing opening, and a sleeve mounted and freely turnable on said spindle and provided with an evener.

5. In combination, an implement frame provided with a front head having a vertical bearing opening and with a bearing sleeve arranged below and alined with said opening and fixed to the frame, a freely laterally swingable trailing caster wheel truck comprising an upright spindle freely turnable in said sleeve and in said opening, a front evener, and a sleeve freely turnable on said spindle and arranged between said bearing sleeve and said head, said evener being secured to and carried by said freely turnable sleeve.

6. In combination, an implement frame provided with a front steering tongue pivotally joined thereto to swing vertically, and a front freely swingable trailing caster wheel truck comprising a vertical spindle freely rotatable in and upholding the front of said frame and provided with an evener freely swingable on said spindle on which said truck swings or casters.

7. In combination, an implement frame having a rigid forward extension comprising side bars and a head fixed to said side bars and having a vertical bearing opening, said side bars being extended forwardly beyond said head, a tongue arranged between said forward extensions of the side bars and pivoted thereto to swing vertically, and a freely swingable caster wheel front truck upholding said frame extension and comprising a vertical spindle turnable in said bearing opening, and an evener arranged behind said spindle and carried by and provided with a front vertical sleeve mounted and freely turnable on said spindle.

8. In combination, an implement frame having a forward extension, alined vertical bearing boxes carried by said frame, a front caster wheel truck upholding said extension and freely swingable with respect thereto and comprising a vertical spindle mounted in said boxes, an evener arranged transversely of said extension and immediately thereunder and behind said spindle, and a sleeve rigidly secured to and carrying said evener and mounted and freely turnable on said spindle.

9. In combination, an agricultural implement frame having a vertical bearing opening, a trailing caster wheel truck having a vertical frame-upholding spindle rotatable in said opening and constituting the axis on which said truck is freely swingable laterally, a frame-steering tongue coupled to said frame independently of said truck and its spindle, hitch mechanism for the draft coupled to said spindle immediately below said frame to apply the draft to the frame through the medium of said spindle, and a sleeve freely rotatable on said spindle and constituting the means by which said mechanism is coupled to said spindle.

10. In combination, a frame provided with a rigid central forwardly tapering projection at its central front end provided with a head having a vertical bearing opening and a distance below said head and alined with said opening provided with a bearing sleeve rigid with said projection, a wheeled front truck provided with a vertical spindle extending through and turnable in said sleeve and said opening and having means to uphold said projection of the frame, a front tongue, and hitch mechanism.

11. In combination, a frame provided with a rigid central forward projection having vertically spaced alined bearings, a wheeled front truck having a vertical spindle arranged and freely turnable in said bearings and upholding said projection, a front tongue pivoted to said extension, and an evener mounted on the spindle between said bearings.

12. In combination, an implement frame, a frame-upholding truck having a vertical spindle mounted to turn in the frame and having a rearwardly extending lower end, a freely rotatable sleeve longitudinally arranged on said lower end and formed with a depending transversely arranged bolster-like member, a fixed shaft arranged longitudinally of and clamped to said member and at its ends projecting beyond the same, and wheels mounted on the ends of said shaft.

13. In combination, an implement frame, a wheeled truck having an upright spindle pivotally confined to the frame, an evener provided with rearwardly extending and depending truss rods, and a sleeve mounted on said spindle, said evener being fixed to and carried by said sleeve, said sleeve provided with abutments receiving the central portions of said truss rods.

14. In combination, a frame, a centrally arranged wheeled front truck upholding the front of said frame and coupled thereto pivotally to turn independently thereof on a vertical axis, a tongue coupled to said frame for steering the same, and hitch mechanism directly applied to the vertical axis of said truck independently of said frame and of said tongue for applying the draft to the frame through the medium of the truck.

15. In combination, an implement frame, a vertical spindle coupled thereto, hitch mechanism comprising an evener, and a bracket carrying the evener and fixed to the center thereof and provided with a vertical bearing sleeve mounted on said spindle and carrying said bracket.

16. In combination, an implement frame, a vertical spindle coupled thereto, a sleeve mounted on said spindle immediately below said frame and formed with a rearwardly projecting bracket, and a hitch mechanism evener arranged below said frame and in rear of said spindle and fixed to and carried by said bracket.

17. In combination, an implement frame, a vertical spindle coupled thereto, a bracket provided with means whereby said bracket is mounted on said spindle, and a hitch mechanism evener provided with a truss rod at its ends secured to the end portions of the evener, said bracket provided with an abutment receiving the central portion of said truss rod.

18. In combination, an implement frame, a hitch mechanism evener therefor provided with rearwardly extending and depending truss rods secured to the end portions of the evener, and a supporting bracket and sleeve whereby said evener is supported and coupled for applying the draft to the frame, said bracket and sleeve provided with abutments for the central portions of said rods.

19. In combination, an implement frame, a frame-upholding wheeled truck having a vertical spindle coupled to the frame and forming the vertical axis on which the truck oscillates independently of the frame, and draft hitch mechanism for said frame comprising an evener arranged under the frame and immediately in rear of said spindle and directly and pivotally coupled thereto to freely swing thereon and apply the draft to said frame through said spindle.

WILLIAM ELLIOTT.

Copies of this patent may be obtained for five cents each, by addressing the "Commissioner of Patents, Washington, D. C."